United States Patent [19]

Yoshimaru et al.

[11] Patent Number: 4,498,107
[45] Date of Patent: Feb. 5, 1985

[54] DOCUMENT INFORMATION FILING SYSTEM

[75] Inventors: Tomohisa Yoshimaru; Kazuki Yamamoto, both of Yokohama, Japan

[73] Assignee: Tokyo Shibaura Denki Kabushiki Kaisha, Kawasaki, Japan

[21] Appl. No.: 256,253

[22] Filed: Apr. 21, 1981

[30] Foreign Application Priority Data

Apr. 23, 1980 [JP] Japan .................................. 55-54054

[51] Int. Cl.³ .............................................. H04M 1/00
[52] U.S. Cl. .................................... 358/256; 358/280; 358/301; 358/903
[58] Field of Search ............... 358/296, 301, 102, 903, 358/256, 280; 360/14.2, 19, 14.3, 72.3, 72.2, 49, 35.1, 33; 364/518, 520, 519, 521, 522, 523

[56] References Cited

U.S. PATENT DOCUMENTS

| 3,987,484 | 10/1976 | Bosche et al. | 360/14.3 |
| 4,000,510 | 12/1976 | Cheney et al. | 360/72.2 |
| 4,089,027 | 5/1978 | Grigoletti | 360/72.2 |
| 4,196,450 | 4/1980 | Miller et al. | 358/903 |
| 4,205,780 | 6/1980 | Burns et al. | 364/521 |
| 4,268,872 | 5/1981 | Kokaji et al. | 358/301 |

OTHER PUBLICATIONS

Hewlett Packard Journal, Mar. 1981, "Display Station's User Interface is Designed for Increased Productivity" by Graham.

Primary Examiner—John C. Martin
Assistant Examiner—Edward L. Coles
Attorney, Agent, or Firm—Cushman, Darby & Cushman

[57] ABSTRACT

A document information filing system has a function of displaying a plurality of its operation modes such as "SEARCH", "RECORD", "DELETE" and "CHANGE" modes on a display device. When a given operation mode is selected by a keyboard, sequential guidance for the procedure of operation for the selected operation mode is displayed on the display device, whereby the operation of the selected operation mode can be executed by operating the keyboard in conformity to the display guidance.

8 Claims, 14 Drawing Figures

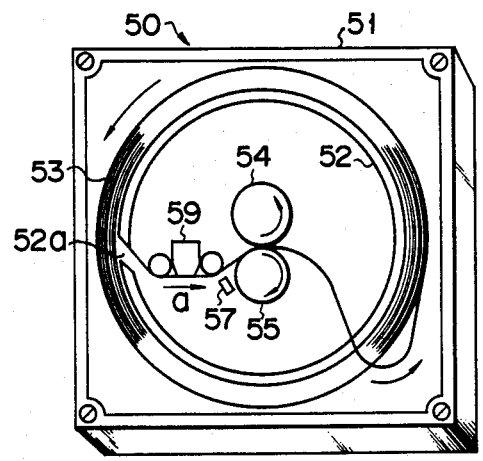
FIG. 3
FIG. 5
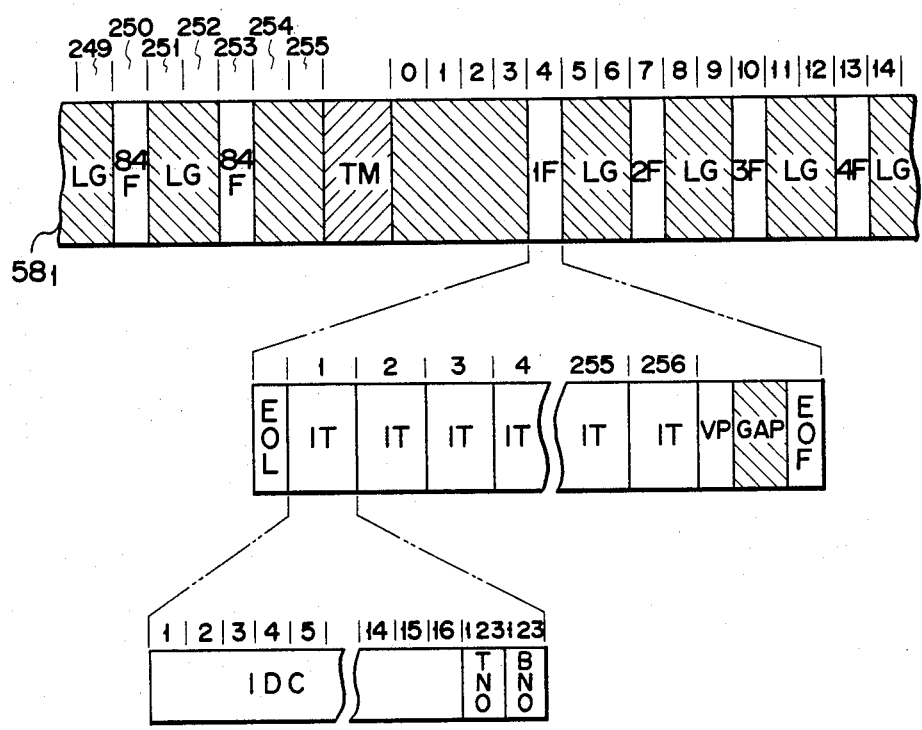
FIG. 6
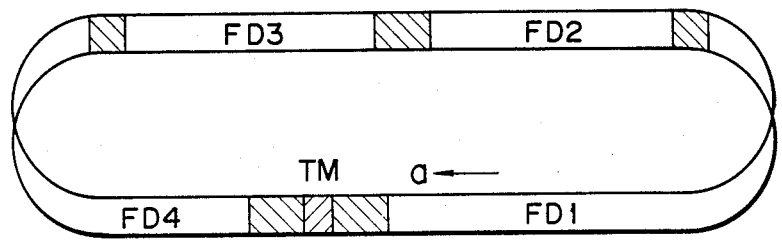

FIG. 8A

```
MODE SELECT
 1   SEARCH
 2   RECORD
 3   DELETE
 4   CHANGE
```

FIG. 8B

```
CHANGE
 1  ID CODE ONLY ?
 2  IMAGE ONLY ?
```

FIG. 8C

```
CHANGE

OLD ID CODE ?
```

FIG. 8D

```
CHANGE

NEW ID CODE ?
```

FIG. 8E

```
CHANGE

ID CODE ?
```

FIG. 8F

```
CHANGE

SET DOCUMENT
```

DOCUMENT INFORMATION FILING SYSTEM

BACKGROUND OF THE INVENTION

This invention relates to a document information system capable of optically reading image information such as documents, storing the document information, and optionally printing out the stored document information.

Recently, document information filing systems for reading out a great deal of image information of documents and the like through two-dimensional optical scanning for storing the read-out image information in an image information memory device of a large capacity, for instance a video tape recorder, and also reading out and printing desired image information among the stored information have been developed.

In such document information filing system, however, if the classifying or searching system for the image information filed in the memory device is changed, it is necessary to also change the index codes of the index information stored in the memory. While it is desirable that the change of the index code be made independently and simply, hitherto there have been developed no systems which can meet this end.

SUMMARY OF THE INVENTION

An object of the invention, accordingly, is to provide a document information filing system, in which the change of the index codes can be made simply and independently of the image information.

According to the invention, when a change mode is set, some contents of change are displayed together with respective operation key codes on a display device. When a key corresponding to an operation key code for the desired content of change is operated, successive guidance displays for the procedure of the change operation are produced on the display device so that key operation may be effected in conformity to the display guidance for changing the index information.

BRIEF DESCRIPTION OF THE DRAWINGS

FIG. 3 is a perspective view showing an endless magnetic cassette tape;

FIG. 5 is a view showing a recording format of the index track of the magnetic tape;

FIG. 6 is a view showing a format of the index track as a whole;

FIGS. 8A to 8F are views showing various states of display on a display device.

DETAILED DESCRIPTION OF THE PREFERRED EMBODIMENTS

Figure 1:
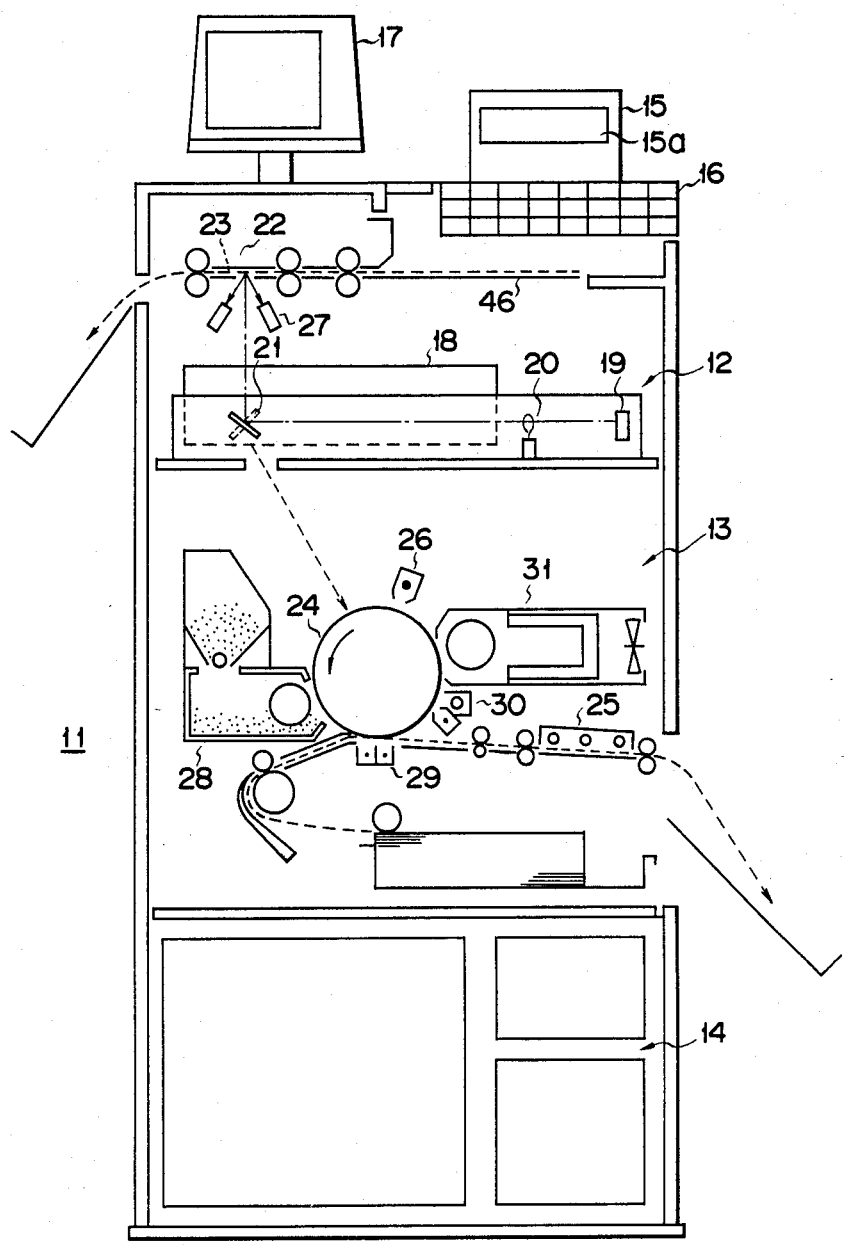
FIG. 1 is a schematic view showing an embodiment of the document information filing system according to the invention.

Referring now to FIG. 1, there is shown a document information filing system generally designated at 11. The console of the system accommodates a scanner section 12, a printing device 13 and a control section 14, and its top is provided with a longitudinal video recorder (LVR) 15, a keyboard 16 and a display device 17. In the scanner section 12, a laser oscillator 18, a mirror 19, an optical scanner 20 and a flip mirror 21 are provided. When the flip mirror 21 is directed to a document 23 transferred to a scanning position by a document transfer system 22, it leads a laser beam toward the document 23. In the printing device 13, a photoconductive drum 24 is provided, and a charger 26, a developer 28, a transfer charger 29, an erasing charger and exposure unit 30 and a cleaning unit 31 are provided around the photoconductive drum 24 in the mentioned order in the rotating direction of the drum 24.

Figure 2:
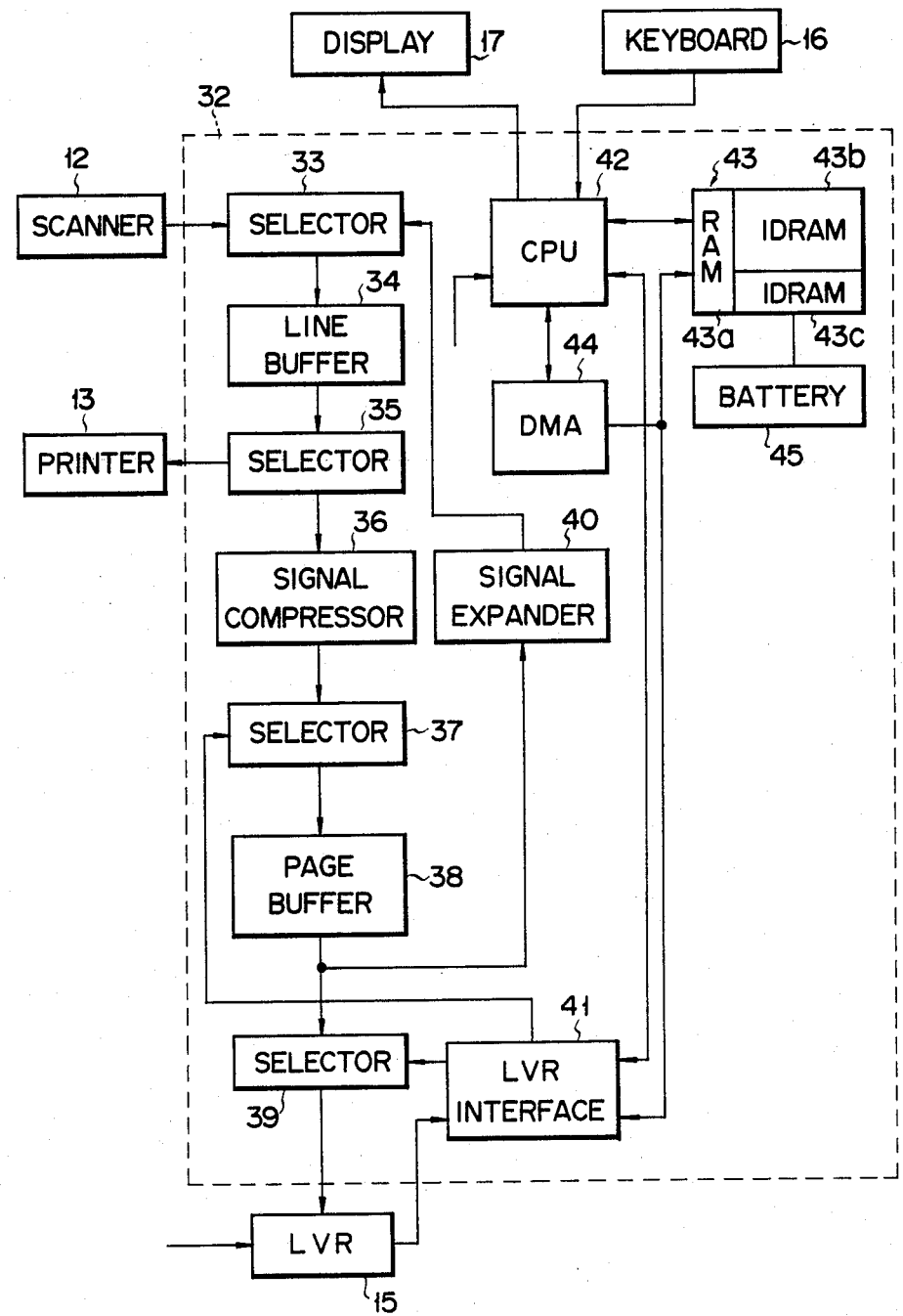
FIG. 2 is a block diagram showing the detailed construction of the control section in the document information filing system according to the invention.

FIG. 2 shows a schematic block circuit diagram of the document information filing system 11. As is shown in the Figure, the scanner 12 and keyboard 16 are connected to a control section 32. The control section 32 is connected to the printing device 13, the LVR 15 and the display unit 17. The control section 32 includes a selector 33 having a first input terminal connected to the output terminal of the scanner 12 and an output terminal connected to an input terminal of the line buffer 34, which has its output terminal connected to an input terminal of the selector 35. The selector 35 has first and second output terminals respectively connected to input terminals of the printer 13 and an information compressor 36. The information compressor 36 has its output terminal connected to a first input terminal of a selector 37, which has its output terminal connected to an input terminal of a page buffer 38. The page buffer 38 has its output terminal connected to a first input terminal of a selector 39 and also connected through an information expander 40 to a second input terminal of the selector 33. The selector 39 has its output terminal connected to an input terminal of the LVR 15, which has its output terminal connected to an input terminal of an LVR interface 41. The LVR interface 41 has its first output terminal connected to a second input terminal of the selector 37 and its second output terminal connected to a second input terminal of the selector 39. It also has its first input/output terminal connected to a CPU (for instance, intel microprocessor 8085) 42 and its second input/output terminal connected to a RAM section 43 and also to a DMA (for instance, intel DMA 8257) 44. The RAM section 43 has a program RAM 43a, an ID RAM (for instance, intel RAM 2117) 43b and an ID non-volatile RAM (for instance, CMOS Memory) 43c. The ID RAM 43c is always furnished with power from a back-up battery 45. In the RAM 43a, an operation program for the document information filing system 11 is stored.

Figure 4:
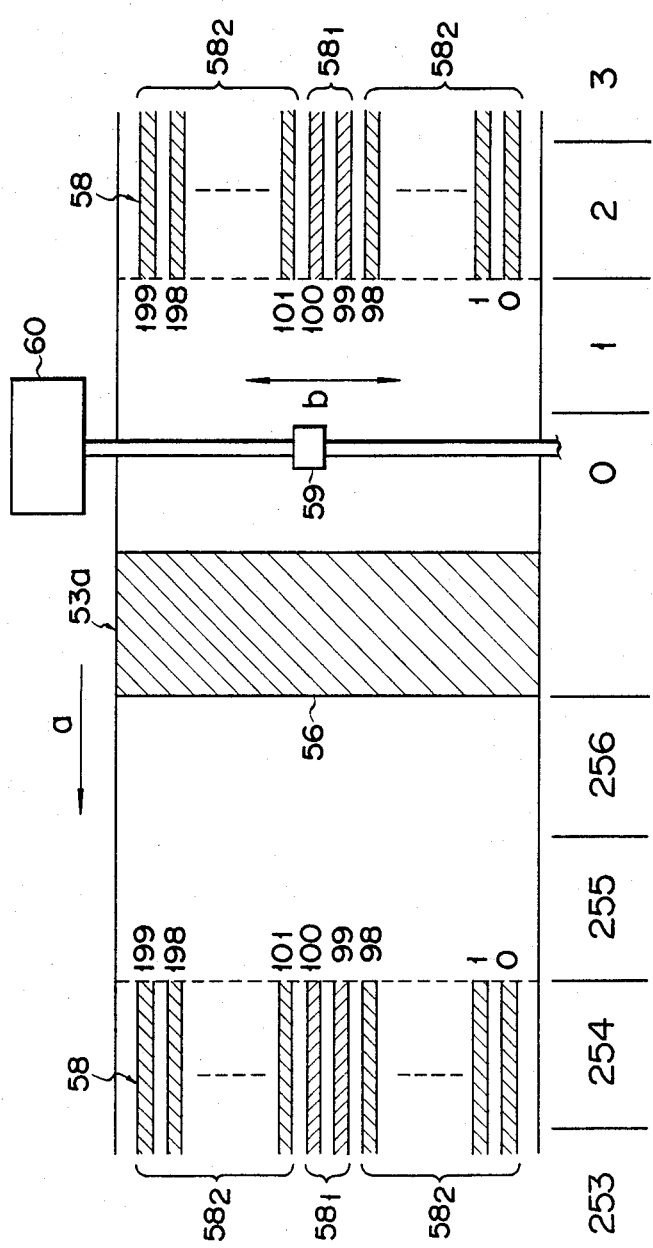
FIG. 4 is a view showing tracks on the magnetic tape.

The document information filing system as described above is used with an endless magnetic tape cassette 50 as shown in FIG. 3. The endless magnetic tape cassette 50 includes a case 51, in which an endless magnetic tape 53 wound on a stationary reel 52 is accommodated. The tape 53 has a width of ½ inch and a length of 118 feet. When the tape cassette 50 is mounted in the LVR 15, the tape 53 wound on the stationary reel 52 is pulled out from the innermost turn of its roll through a slit or window 52a formed in the reel 52 and run at a high speed (about 16.4 feet/sec) in the direction of arrow a by a capstan 54 and a pinch roller 55 to be wound again on the outermost turn of the tape roll. The tape 53 thus completes one excursion in about 7.2 seconds. As shown in FIG. 4, the tape 53 has a seam section 53a, which is shown as such by a tape mark 56, for instance formed of a silver foil applied to the tape. One excursion of the tape 53 is confirmed when the tape mark 56 is optically detected by a tape mark detector 57. The output signal from the tape mark detector 57 is used as a reference signal for detecting the block position of the tape 53 (to be described later). The tape 53 has 200 parallel recording tracks 58 extending in the direction a of its progress (the tracks each having a width of about 40μ and being spaced apart at a pitch of about 52μ). The tracks 58 are given successive track numbers "0", "1", "2", . . . , "199" from the lowermost track. Of these tracks, substantially the central two tracks, i.e., the tracks of the track numbers "99" and "100" are index recording tracks $58_1$ (the track of the track number "99" being a back-up track) for recording index information peculiar to unit image information (including an index code and a recording address which represent the track number and block number), while the remaining 198 tracks (of the track numbers "0" to "98" and "101" to "199") are image information recording tracks $58_2$ for recording image information. As shown in FIG. 4, each recording track 58 is divided in the direction of the tape length into 256 blocks which are given successive block numbers "0", "1", "2", . . . , "255". The recording of information on the tape 53 or reproduction of the recorded information is made by selecting a given track 58 with a recording/reproducing head (magnetic head) provided in the neighborhood of the capstan 54 moved reciprocably and stepwise at a step interval of microns in the direction b perpendicular to the tape running direction a by a head access device 60.

FIG. 5 shows the recording format of the index recording track $58_1$. Of the 256 blocks, those as the first one of three successive blocks as counted from, for instance, the fourth block, i.e., the fourth, seventh, tenth and so forth blocks are for recording the index information, and these blocks are referred to as the first, second, third and so forth frames (1F), (2F), (3F), . . . , respectively. The two successive blocks between adjacent frames constitute an ineffective information area (LG). Each frame includes a frame start code (EOL), 256, i.e., 1-st to 256-th, items (IT), a horizontal parity check code (VP), a recording gap (GAP) and a frame end code (EOF). Each item includes an index code (IDC) constituted by 16 or less digits representing a title or features, a track number (TNO) of the track on which an image information having the identical index code is recorded and a block number (BNO) which is the number of the first one of the blocks on which the image information is recorded. Thus, in this embodiment 256 items of index information constitute an index information unit which is recorded in one frame. The alphanumeric and symbol for the index code are each constituted by a 7-bit code and a one-bit vertical parity check code, and the track number and block number are each constituted by a 7-bit numeral code and a one-bit vertical parity check code. According to the invention, in order to reduce the index information search period and eliminate the adverse effects of the drop-out, the same index information is recorded a plurality of times on the index recording track $58_1$. For example, as shown in FIG. 6, the same index information is recorded for every 21 frames, i.e., four times for one excursion of the tape 53. In the case of FIG. 6, the same index information is recorded in individual fields FD1 to FD4, the field FD1 starting with the first frame, the field FD2 starting with the twenty-second frame, the field FD3 starting with the forty-third frame, and the field FD4 starting with the sixty-fourth frame. The fields FD1 to FD4 constitutes a file index information group for all the image information recorded on one tape 53.

In operation, when the endless magnetic tape cassette 50 is loaded in the cassette holder of the LVR 15 shown in FIG. 1, the endless magnetic tape 53 in the cassette tape 50 is run in the direction of arrow a in FIG. 3 by the capstan 54 and pinch roller 55. At this time, the revolution speed of the motor (not shown) for driving the capstan 54 is detected, and the revolution speed data is transmitted through the LVR interface 41 to the CPU 42. The CPU monitors the motor revolution speed, and when the motor revolution speed reaches a constant value, it gives a head drive instruction through the LVR interface 41 to the LVR 15. In response to this drive instruction, the LVR 15 moves the head 59 (FIG. 3) to a position corresponding to the index recording track $58_1$. At this time, the start address of the ID RAM 43b is set in the DMA 44 of the control section 32, and also the byte number of the index information stored in the index recording track $58_1$ of the magnetic tape 53 is set in the DMA 44. In the instant embodiment, the byte number is 256×22. When the portion of the tape between the fields FD1 and FD2 of the index recording track $58_1$ (FIG. 6) comes to the position of the head 59, the CPU sets a DMA mode. As a result, data reproduced from the index recording track $58_1$, i.e., the data in the field FD2, is successively recorded in the back-up ID RAM 43b by the LVR 15 in the DMA mode, i.e., under the control of the DMA 44. At this time, if it fails to obtain reading of data from the field FD2 due to such cause as drop-out, the same data is read out from the next field FD3. Next, the CPU 42 retrieves from the index information stored in the ID RAM 43b, an item (IT) which has IDC (FIG. 5) indicated by a specific code. The track number (TNO̅) and block number (BNO̅) of that item are the numbers of the track and block in which new image information should be recorded. The CPU operates to cause all the frames inclusive of the item to be stored in the back-up ID RAM 43c. Thus, the preparation for storage, retrieval and commencement of reading operation is completed by storing in the ID RAM 43b the frame already made full of 256 items and by storing in the back-up ID RAM 43c the frame not made full of such items.

Figure 7:
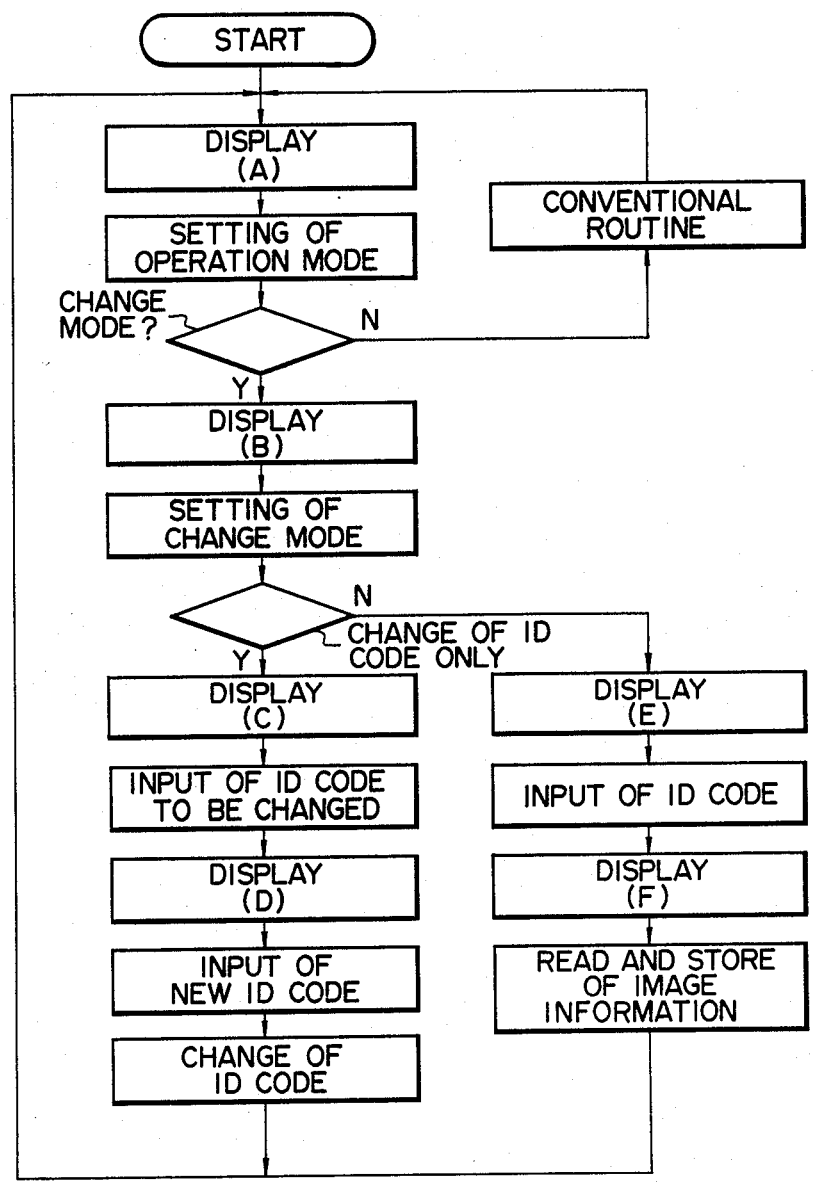
FIG. 7 is a flow chart illustrating the operation of the document information filing system.
Figure 9:
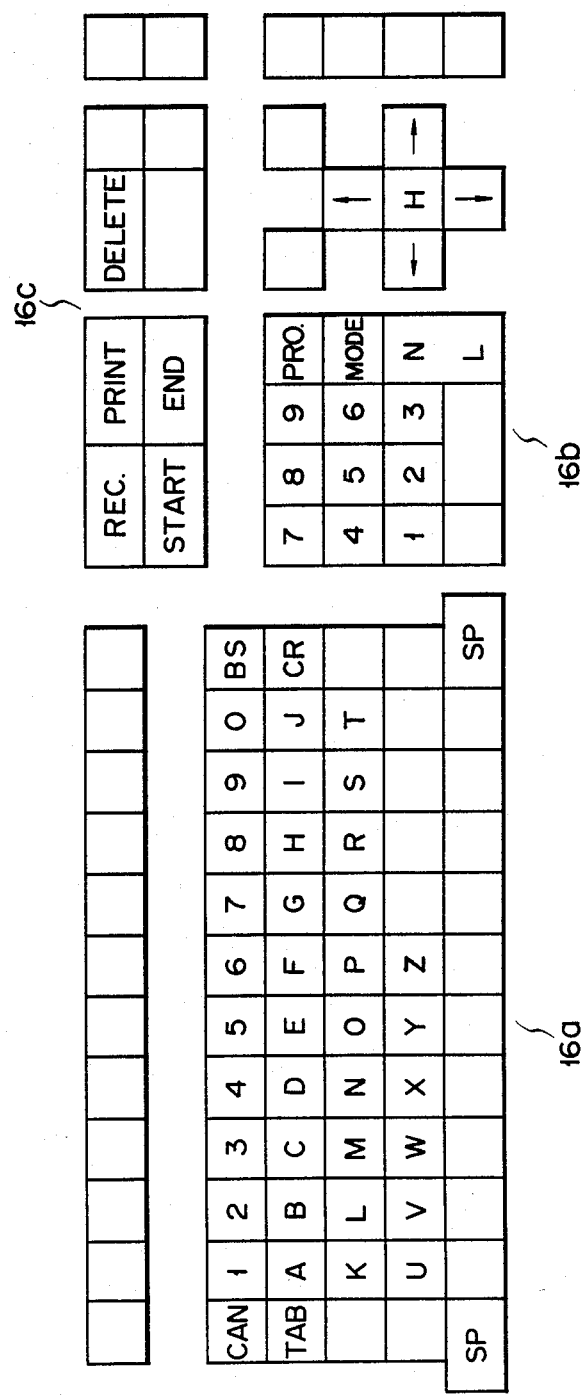
FIG. 9 is a plan view showing a keyboard.

The operation of the document information filing system 11 from this state will now be described with reference to the flow chart of FIG. 7. When the "START" key in a function key section 16a of the keyboard 16 as shown in FIG. 9 is depressed, several different operation modes are displayed together with their key numbers as shown in FIG. 8A. These operation mode data are preliminarily stored in the RAM 43a, and they are read out from the RAM 43a and coupled to the display device 17 by the CPU 42 in response to the operation of the "START" key. For selecting a desired operation mode, for instance a "RECORD" mode among the displayed operation modes, the key for this mode, i.e., the key of key number "2" in the digital ten key section 16b, is depressed. Then, an index code of 16 or less bits representing the title and features of the image information of the document 23 to be recorded is coupled to the control section 32 from the alphanumeric key section 16a in the keyboard 16 shown in FIG. 7. Subsequently, an "NL" key in the key section 16b is depressed, whereby the document 23 shown in FIG. 1 is set in a document setting position 46 and then transferred to a scanning position by the document transfer system 22. When this state is brought about, the laser oscillator 18 generates a laser beam, which is directed by the mirror 19 to the optical scanner 20. The optical scanner 20 swings the laser beam in the horizontal directions whereby the document 23 is scanned two-dimensionally by the laser beam through the flip mirror 21. The laser beam reflected by the document 23 is coupled to the optical sensor 27 and converted thereby into an image signal corresponding to the image patterns of the document 23. The image signal is coupled through the selector 33 shown in FIG. 2 to the line buffer 34 and stored therein for one scanning line after another. The image information stored in the line buffer 34 is transferred through the selector 35 to the information compressor 36 and reduced redundancy by the modified Hoffman conversion method. The image information reduced redundancy is transferred for each scanning line through the selector 37 to the page buffer 38 and stored therein. When one unit, i.e., one page, of image information is stored in the page buffer 38, the CPU 42 retrieves for a desired item (IT) represented by the aforesaid specific code among 256 items in one frame stored in the back-up ID RAM 43c and stores the track number (TNOS) and block number (BNOS) of the item found out in the RAM 43b. TNOS and BNOS respectively represent the recording position, i.e., position of track, where the relevant image information is to be recorded on the magnetic tape 53 and the recording start position on the track, i.e., the first block in the track. Then, the CPU 42 gives an instruction, which demands the shift of the magnetic head 59 on the basis of the track number and block number stored in the ID RAM 43a, through the LVR interface 41 to the LVR 15. According to this shift instruction, a head driver 60 shifts the magnetic head 59 to a position corresponding to the track of the aforementioned track number, for instance $\overline{TNOS}$ "0". When the head 59 is shifted to the position corresponding to the track of the track $\overline{TNOS}$ "50" and then the block of the aforementioned block number, for instance $\overline{TNOS}$ "50", on this track, the image information stored in the page buffer 38 is read out and coupled through the selector 39 to the LVR 15 for every scanning line. The LVR 15 records the image information coupled to it on the track $\overline{TNOS}$ "50" from the block $\overline{BNOS}$ "0". If there are image information that has already been recorded, a gap corresponding to two blocks are provided between the previously recorded image information and the image information to be newly recorded. When the image information of one unit, i.e., for one page, has been completely recorded on the track "0" of the magnetic tape, the CPU 42 detects the block number of the block in which the end of the image information is recorded and checks whether this block number is less than the last block number "254" of the track. The block number of the block where the information end is recorded is obtained from a block counter provided in the CPU 42. The block counter is cleared by the detection signal generated from the tape mark detector 57 upon detection of the mark 56 of the tape 53, and its count is incremented according to a clock pulse signal (with a pulse repetition period of about 28 msec) generated in synchronism with the running of the tape 53 from "0" up to "255" in one excursion of the tape 53. If the count of the block counter is less than "254", "3" is added to it, and the result $\overline{BNOS}'$ is stored in the IT' next to the IT recording the $\overline{TNOS}$ and $\overline{BNOS}$ of the RAM 43c together with the track $\overline{TNOS}$ "50" in the RAM 43b. If the count is equal to "254", the block $\overline{BNOS}'$ "2" and the track number increased by 1, i.e., the track $\overline{TNOS}'$ "51" are stored in the RAM 43c. At this time, the recording start address (i.e., track $\overline{TNOS}'$ and block $\overline{BNOS}'$) of the image information to be recorded next is stored in the address corresponding to the IT' in the RAM 43c. If the recording of image information for one page is not completed when the count of the block counter reaches "254", the CPU 42 interrupts the recording operation and shifts the magnetic head 59 to the position corresponding to the next track, i.e., track "51", for recording the remaining image information on this track "51". When the unit image information is completely recorded on the magnetic tape, the succeeding recording start address ($\overline{TNOS}'$ and $\overline{BNOS}'$) is stored in the RAM 43a in the manner as described above. At this time, the CPU 42 causes the display of the recording start address, i.e., track number and block number, on the display device 17. The operator can thus have the knowledge of the remaining tracks and blocks from the displayed track number and block number. Then, the CPU 42 stores the index code previously coupled from the keyboard 16, i.e., the index code representing the title and features of the image information recorded, in the address of the RAM 43c corresponding to the IDC of the IT recording the $\overline{TNOS}$ and $\overline{BNOS}$ in corresponding to the recording start address. In this way, the index information for image information for one page, i.e., the items IT shown in FIG. 5, is stored in the RAM 43c. In this situation, the recording start address, including for instance track $\overline{TNOS}'$ "50" and block $\overline{BNOS}'$ "50", is stored in the RAM 43a. Thereafter, the next unit image information is recorded on the magnetic tape 53 from the block "50" of the track "50". In the above way, image information of a plurality of documents is successively recorded on the magnetic tape 53, and also the index information for the image information is successively stored in the RAM 43c. When the RAM 43c is fulled with 256 items, the CPU 42 delivers to the LVR 15 an instruction for shifting the magnetic head 59 to the position corresponding to the index recording track 58₁. When the magnetic head 59 reaches the index track 58₁, all the index information stored in the RAM 43c are stored in the index track 58₁. If the RAM 43c is not fulled with 256 items after the image information of the necessary documents are completely recorded on the tape 53, the end of recording is set by the keyboard 16 at this time, that is to say, closure processing is set. At this time, like the aforementioned case, the head 59 is shifted to the index recording rack 58₁, and the index information stored in the RAM 43c is entirely recorded on the index recording track 58₁. If the power source is turned off without the closure processing, since the new items are stored in the back-up RAM 43c, the closure processing is carried out at turning-on of the power source.

Now, the operation will be described in conjunction with the case of reading out and printing the image information recorded on the magnetic tape 53. In this case, the key for the "SEARCH" mode, i.e., the key of the key number "1", as in the display in FIG. 8A, is depressed. Then, the index code, i.e., track number and block number, corresponding to the image information to be read out is coupled to the control section 32 by operating the keyboard 16, and the "NL" key of the digital key 16 is depressed. At this time, the magnetic head 59 is shifted to the position corresponding to the index recording track 58₁, and the index information recorded on the index recording track 58₁ is read out and stored in the RAM 43b under the control of the CPU 42. Thereafter, the CPU 42 retrieves for the aforementioned coupled index code among the index information stored in the RAM 43b at a high speed. When the index code is found out, the track number and block number of this index code, for instance track number "10" and block number "50", are stored in another address of the RAM 43a. At this time, the index code found out is displayed on the display device 17. Also, the magnetic head 59 is shifted to the position corresponding to the track "10". Then, the block counter of the CPU 42 counts blocks as the magnetic tape 53 is being run at high speed. When the count of the block counter coincides with the block number stored in the RAM 43a, the CPU 42 gives a reproducing instruction to the LVR 15. Upon receipt of this instruction, the LVR 15 reproduces image information in blocks from the block "50", and the reproduced signal is coupled through the LVR interface 41 and selector 37 to the page buffer 15 and stored therein. When the image information for one page is entirely stored in the page buffer 15, the CPU 42 reads out image information one scanning line after another from the page buffer 38 and supplies it to the signal information expander 40. The signal expander 40 restores the image information reduced redundancy by the modified Hoffman reverse conversion. The image information output of the information expander 40 is coupled through the selector 33 to the line buffer 34 and stored therein. The image information stored in the line buffer 34 is supplied as serial image information signals to the printer 13 in synchronism to the operation timing of the printer 13. In the printer 13, the input image information signals are coupled to a laser modulator provided on the output side of the laser oscillator 18 shown in FIG. 1 for modulating the laser beam. As the laser beam is modulated according to the image information signals, it scans the photoconductive drum 24 through the mirror 19, optical scanner 20 and flip mirror 21 to form a latent image corresponding to the image information on the drum. The latent image thus formed is developed as it passes by the developing station 28, and the developed image is transferred onto a copy sheet by a transfer charger 29 and fixed by a fixer 25 so that it is provided as a hard copy. When it is desired to obtain a hard copy of different image information subsequently, the index code of the desired image information is coupled to the control section 32 by operating the keyboard 16, and the start button is depressed. As a result, the coupled index address is searched for among the index addresses stored in the RAM 43b, and when it is found out, a hard copy is produced from the printer 13 through the process as described above.

Now, the operation will be described in connection with the change mode. For selecting the change mode, the key for the "CHANGE" mode, i.e., the key of the key number "4" is depressed, and also the "NL" key is depressed. As a result, a guidance display as shown in FIG. 8B is produced on the display device 17. If it is desired to change only the ID code after confirming this display, the key corresponding to the "ID CODE ONLY?" display, i.e., the key of the key number "1", in the digital key section 16b is depressed. As a result, a guidance display "OLD ID CODE?" as shown in FIG. 8C is produced on the display device 17. By confirming this display, the old ID code is coupled to the control section 32 by operating the alphanumeric key section 16a, and then the "NL" key is depressed. As a result, the old ID code is retrieved from the RAM 43c. When it is found out, a guidance display "NEW ID CODE?" as shown in FIG. 8D is produced on the display device 17. By confirming this display, the new ID code is coupled to the control section 32 by operating the alphanumerical key section 16a, and then the "NL" key is depressed. As a result, the old ID code found out is changed to the new ID code.

If it is desired to change image information, the key corresponding to the "IMAGE ONLY", i.e., the key of the key number "2", in the digital ten key section is depressed by confirming the guidance display shown in FIG. 8B, and then the "NL" key is depressed. At this time, a guidance display "ID CODE" as shown in FIG. 8F is displayed on the display device 17. By confirming this display, the ID code corresponding to the image information that is desired to be changed is coupled by operating the alphanumeric key section 16a, and then the "NL" key is depressed. As a result, a guidance display "SET DOCUMENT" as shown in FIG. 8F is produced on the display device 17. When the document 23 is set in the document setting position 46 in conformity to this guidance, it is transferred to the scanning position and scanned there, and its image information is stored in the page buffer 38 through the process as described previously. At this time, the track number and block number of the index information for the image information to be changed are retrieved, and when they are found out, the old image information is changed to the new image information stored in the page buffer 38.

In the case of the "DELETE" mode, mere deletion of the old image information is effected.

As has been described in the foregoing, according to the invention when the change mode is selected, the guidance as to whether the change mode is set with respect to the index code or to the image information is displayed on the display device, and when the index code or image information is selected in conformity to the guidance successive guidance displays for the procedure of the operation of the selected change mode are produced on the display device. Thus, the index mode or image information can be changed independently and easily by operating the document information filing system in conformity to the guidance.

While the above embodiment has concerned with a video recorder used with a magnetic tape, it is also possible to use a magnetic disc or an optical disc.

What we claim is:

1. A document information filing system comprising:
   a keyboard including keys for producing index information and keys for setting operation modes of said filing system;
   a scanner for optically scanning a document to be filed and providing image information corresponding thereto;
   a video recorder section having associated therewith a removable multi-track recording medium means for recording a plurality of index data and units of document image information individually corresponding to said respective index data, said video recorder section including recording and reproducing means for effecting recording of information on said recording medium means and reproduction of information including index data from said recording medium means;
   a control section including a first memory means for storing index data reproduced by said video recorder section and index data to be recorded on said recording medium means, a second memory means for storing names of a plurality of operation modes of said system and information about the procedures of operation for said operation modes, and means for retrieving index data for desired image information among the index data stored in said first memory means;

a display device for displaying an operation mode name stored in said second memory means and its associated sequential procedure information for a mode set by operation of said keys for setting operation modes;

means for setting a recording and reproducing element of said recording and reproducing means for said video recorder section at a position corresponding to a particular recording medium track of said recording medium means as specified by the index data speciied by said retrieving means; and means for outputting image information reproduced by said video recorder section one scanning line after another.

2. A document information filing system according to claim 1, wherein said operation modes comprise: a retrieve mode, a record mode, a delete mode and a change mode.

3. A document information filing system according to claim 1, wherein said control section includes an information compressor for reducing redundancy of the image information from said scanner, a page buffer storing the image information reduced redundancy for each page of the document from said information compressor, means for transferring the image information stored in said page buffer to said video recorder section, means for transferring image information reproduced from said video recroder section to said page buffer to be stored therein, an information expander for restoring the reproduced image information stored in said page buffer, and means for transferring the restored image information from said information expander.

4. A document information filing system according to claim 1, wherein said first memory means is a random access memory (RAM).

5. A document information filing system according to claim 1, wherein said video recorder section is a video tape recorder including at least one magnetic head capable of being freely moved to positions corresponding to a particular one of said recording tracks of said magnetic tape.

6. A document information filing system according to claim 1, wherein each piece of said index data includes an index address representing the location of the corresponding stored image information and an index code representing a title and feature of said image information.

7. A document information filing system comprising:

a keyboard including keys for producing index information and keys for setting operation modes of said filing system;

a scanner for optically scanning a document to be filed and providing image information corresponding thereto;

a video recorder having associated therewith a removable recording medium having a first recording track for recording a plurality of index data and a plurality of second recording tracks for recording units of document image information individually corresponding to respective index data, said video recorder including recording and reproducing means for recording information including index data on at least one of said first and second recording tracks and reproducng information therefrom;

a control section including a first memory means for storing index data reproduced by said video recorder and index data to be recorded on said recording medium, a second memory means for storing names of a plurality of operation modes and also information about the procedures of operation for said operation modes of said system, and means for retrieving index data for desired image information among the index data stored in said first memory;

a display device for displaying an operation mode name stored in said second memory means and its associated sequential procedure information for a mode set by operation of said mode setting keys;

means for setting a recording and reproducing element of said recording and reproducing means of said video recorder at a position corresponding to a particular recording medium track specified by the index data determined by said retrieving means;

means for outputting image information reproduced by said video recorder one scanning line after another; and a printing device for producing a hard copy of the image information from said image information output means.

8. A document information filing system according to claim 7, wherein said printing device includes means for forming an optical image corresponding to the image information supplied to said printing device, a photoconductor member for being exposed to said optical image to form a corresponding latent image thereon, means for developing said latent image on said photoconductive member, and means for transferring the image developed by said developing means onto a copy sheet and fixing the transferred developed image.

* * * * *